Feb. 1, 1938.　　　K. E. LYMAN　　　2,107,075
AUTOMATIC CLUTCH
Filed Aug. 30, 1933　　　2 Sheets-Sheet 1
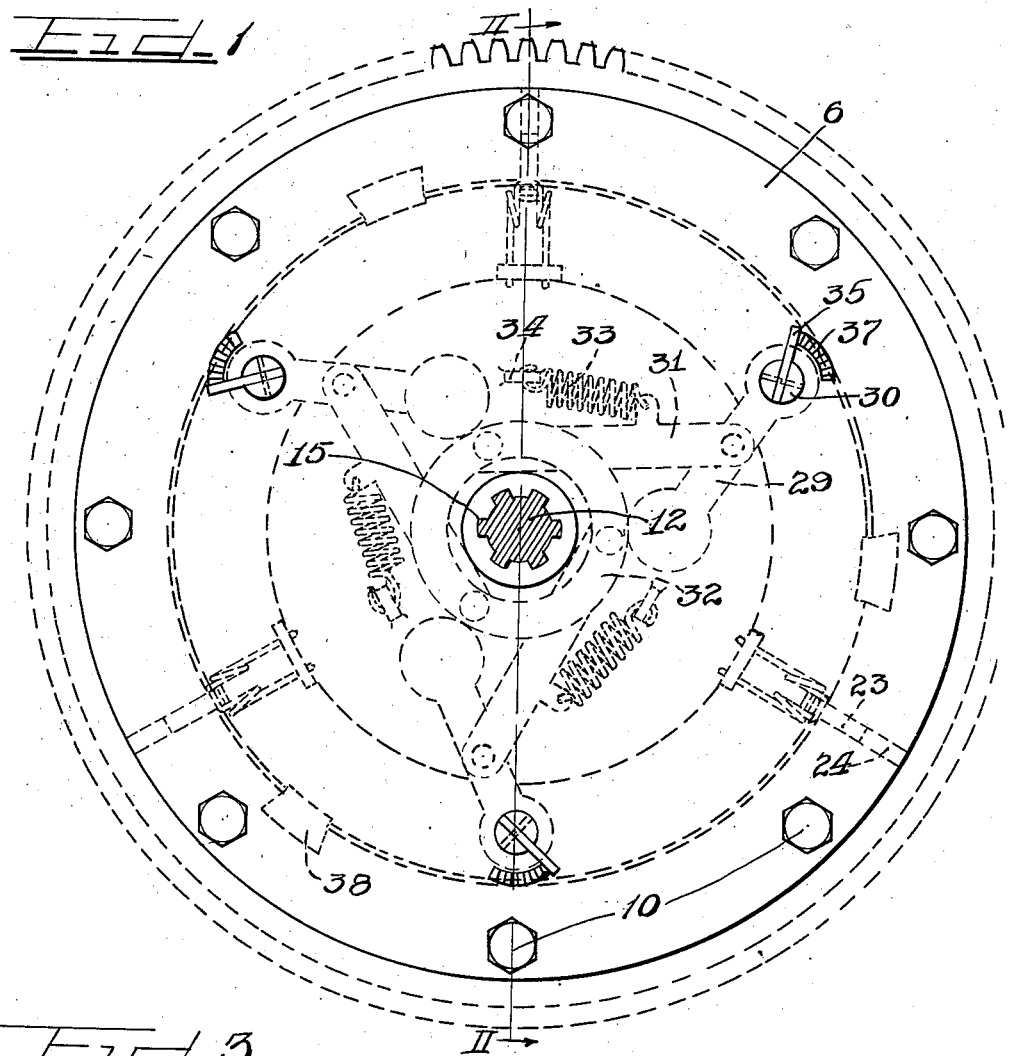
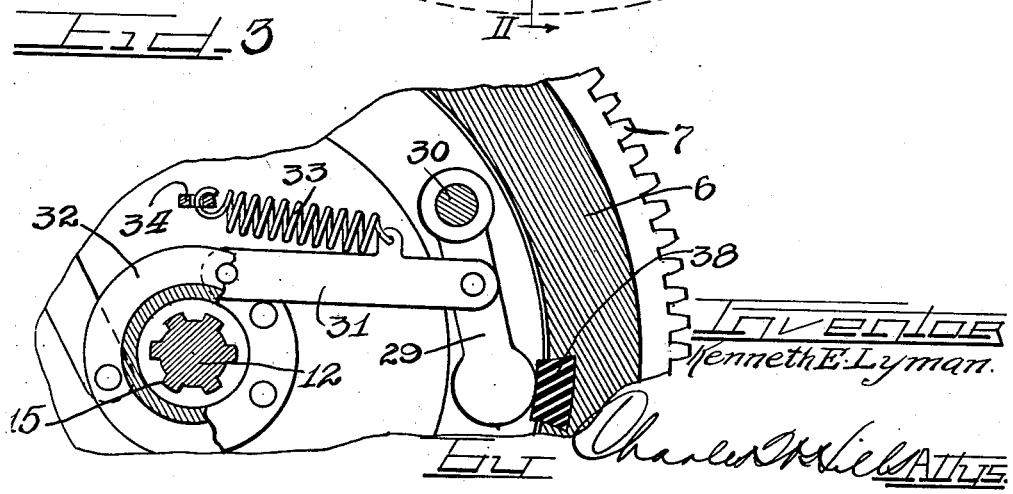

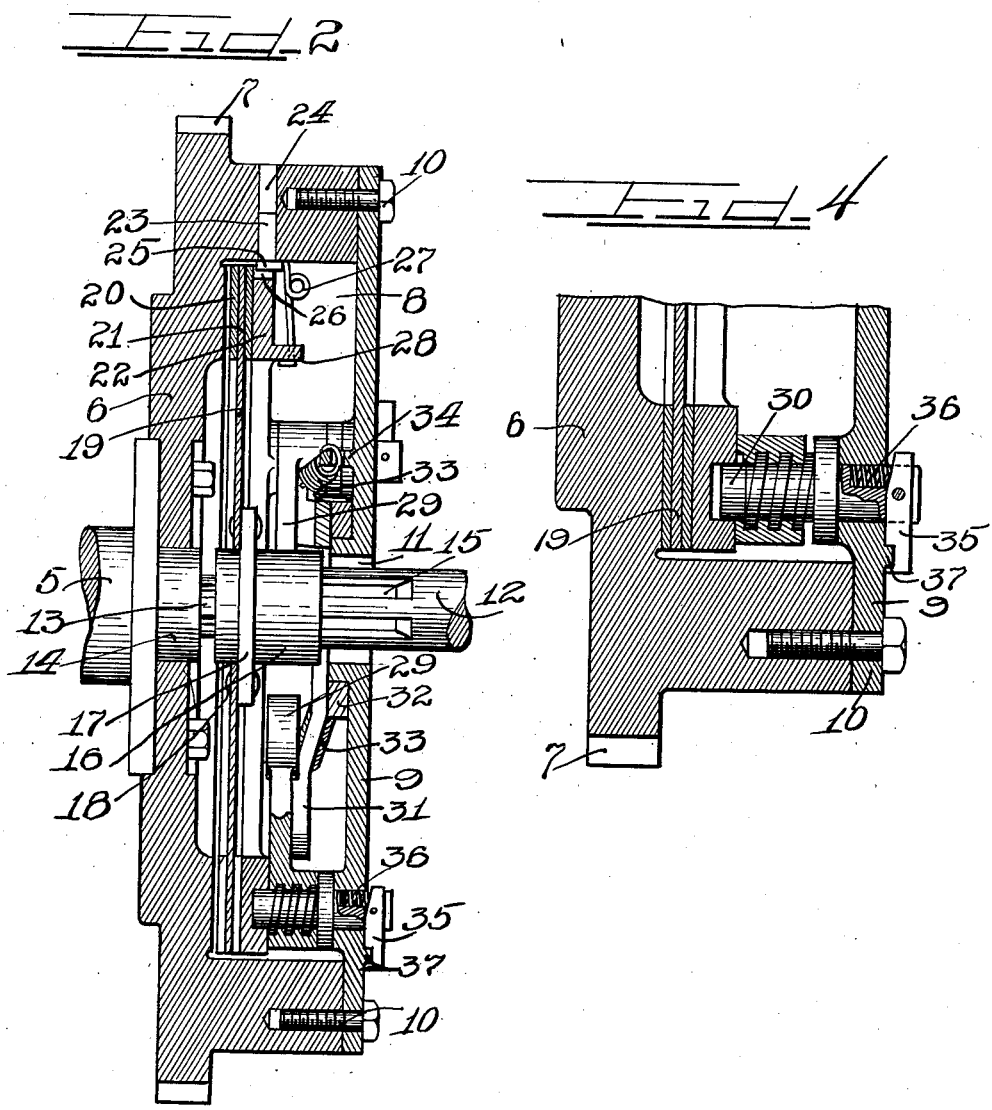

Patented Feb. 1, 1938

2,107,075

UNITED STATES PATENT OFFICE 2,107,075

AUTOMATIC CLUTCH

Kenneth E. Lyman, Lake Forest, Ill.

Application August 30, 1933, Serial No. 687,432

3 Claims. (Cl. 192—105)

The present invention relates in general to power transmissions and has particular reference to an improved automatically controlled friction clutch which finds special utility for automobiles and other machines wherein it becomes desirable to disconnect the driving shaft from the driven shaft so as to interrupt the drive for one reason or another.

The primary object of my invention is to provide a mechanism which is wholly automatic in operation and which is capable of developing a maximum of efficiency as well as one which may be manufactured on an economical basis without sacrificing durability and satisfaction in operation.

While the foregoing briefly explains the nature of the present improvements other objects and advantages not herein specifically referred to will be readily appreciated upon a full comprehension of the novel features presented in the construction, arrangement and manner of operation of the clutch.

In order that the invention may be readily understood, an embodiment of the same is set forth in the accompanying drawings, and in the following detailed description.

It is understood that those skilled in the art may make various changes in the construction and arrangement of the parts without departing from the spirit and scope of the invention as defined in the subjoined claims, and I therefore do not wish to be restricted to the precise construction contained herein.

In the drawings:

Figure 1 is a view in end elevation of a clutch mechanism constructed in accordance with my invention.

Figure 2 is a view in section on the line II—II, Fig. 1.

Figure 3 is a detailed fragmentary view in elevation and partly in section of the centrifugally responsive means which I prefer to employ as an automatic control.

Figure 4 is an enlarged detail sectional view illustrating the adjusting mechanism.

The reference numeral 5 represents a driving shaft which is connected to the flywheel 6 in any manner suitable for the purpose, the flywheel being provided with gear teeth 7 for the self-starter mechanism as is customary. Of course, instead of illustrating the invention in combination with the flywheel, any other drum like structure might have been shown but since the invention finds its utility for the most part in an automobile assembly, I have selected this particular way of illustrating its adaptation.

The flywheel 6 being a drum like structure, provides an internal space 8 (Fig. 2) which is suitable to house my improved clutching mechanism and a cover plate 9 is employed to inclose the same. The cover plate is attached to the flywheel by bolts or the like 10 and is provided with a central opening 11 through which a driven shaft 12 extends into the flywheel. This shaft 12 is made with a pilot 13 which is accommodated in an axial bore in the reduced diameter 14 of the driving shaft 5. A suitable anti-friction bearing is provided within the axial bore so that the shafts 5 and 12 are free to rotate relatively one to the other with a minimum degree of friction.

Mounted on the splined area 15 of the driven shaft 12 is a collar or sleeve 16 which is made with an annular flange 17, to which is secured by bolts or the like 18 a sheet metal plate 19 providing one part of a driven clutching element. The clutching element in this respect is made up of friction material with which the plate 19 is backed on opposite sides as at 20 and 21, a pressure plate 22 being also embodied in the structure. The pressure plate 22 is locked to the flywheel 6 against relative rotation by means of pins 23 which are accommodated in openings 24, with the heads 25 of the pins seated in slots or the like 26 in the pressure plate 22. Springs 27 are employed to hold the connection in place, one end of the springs being anchored on ears 28 on the pressure plate. The opposite ends of the springs bear against the heads 25 of the pins. The sleeve or collar 16 being axially shiftable on the splined area 15 enables the driving connection between the shafts 5 and 12 to be made and released by imparting a thrust to the plate 22.

To impart the necessary thrust to the pressure plate 22 I prefer to employ a plurality of centrifugal arms 29, the anchored ends of which have an internal threaded bore so that each of them may be threaded on a shaft or pin 30 which is threaded to receive them with the threads thereof quick acting, so to speak. It will thus be seen that when the arms 29 are swung outwardly in response to centrifugal force, they will feed along the shafts 30 and bear against the pressure plate 22 thrusting the same forward. In other words, they exert a pressure against the plate 22 so as to shift the clutching element axially on the driven shaft and effect a driving connection with the driving shaft. When the weights swing inwardly they feed back on the shafts 30 releasing the thrust or pressure so that the clutch becomes disengaged.

According to the present embodiment, the arms 29 are each equipped with a pivoted link 31 which is pivoted to a floating ring member 32 common to all of the links. Each of the links 31 is connected intermediate its pivot points to a coil spring 33. The opposite ends of each spring 33 are anchored to an eye or ear 34 formed on the inside face of the cover plate 9. As the weights swing outwardly, the springs 33 provide a yielding resilient resistance and when the centrifugal force is less than the resistance of the springs, the weights will be moved inwardly thereby. By means of this ring member 32 the operation of the weights will be synchronized so that an evenly distributed thrust is imparted to the plate 22.

To account for wear on the friction material, I have provided a convenient way of moving the shafts 30 forwardly so as to adjust the effective pressure that they are capable of developing in combination with the centrifugal arms. This adjustment is preferably realized by extending the shafts 30 through the cover plate 9 and equipping each of them with a pivoted finger or detent 35 which may be pulled out against the resistance of a spring 36. This will thus disengage the detent from the notches of the ratchets 37 and provide a convenient means of threading the shafts 30 forwardly, or backwardly for that matter, thus changing the effective range of pressure exerting movement of the centrifugal arms. When the detents 35 are in engagement with the ratchets 37, the shafts 30 are held against turning.

When the weights swing outwardly to the limit of their movement in this direction, they may abut resilient cushions 38 as best illustrated in Fig. 3.

From the above it will be seen that comparatively small weights may be employed as a centrifugally controlling means without sacrificing the effectiveness of the pressure required, since the screw pressure part of the mechanism will multiply the leverage, so to speak, to such an extent that a very positive and efficient control may be realized.

I claim as my invention:

1. In an automatic clutch including driving and driven power transmitting members and a friction element contributing to the clutching connection between said members, means for automatically controlling the clutching element comprising relatively rotatable threaded members, means for adjusting the relative rotative position of said threaded members, centrifugally responsive weight members pivotal about said threaded members to impart pressure through one member to said element and means to synchronize the operation of said weight members to cause even distribution of the pressure imparted to the clutch member.

2. In an automatic clutch including driving and driven power transmitting members and a friction clutching connection therebetween, means for automatically controlling the clutching action comprising a plurality of threaded members extending in the direction of the thrust to be imparted to said clutching element, a weighted centrifugal arm threaded at its fixed end on each of said threaded members and adapted to feed along the same when responding to centrifugal force, means for adjusting the rotative position of said threaded members with respect to said threaded arms, means for synchronizing the operation of said arms to cause even distribution of the thrust imparted to the clutching element and spring means for controlling the speed at which the centrifugal means will operate.

3. In an automatic clutch for automotive vehicles, driving and driven power transmitting members with a clutch element contributing to a clutching connection between said members, means for automatically controlling the clutching element comprising a screw pressure device including a plurality of screw threaded studs and centrifugally responsive weights mounted respectively upon said studs and adapted to impart a thrust to said element, a link motion connected with said weight, a spring connected with said link motion for yieldably resisting the outward movement of said weight, and means for adjusting said studs rotatively with respect to the centrifugal weights mounted thereon.

KENNETH E. LYMAN.